(No Model.)
G. F. STEARNS.
MANUFACTURE OF AUGER BITS AND OTHER BORING TOOLS.
No. 288,676. Patented Nov. 20, 1883.
Fig: 1.
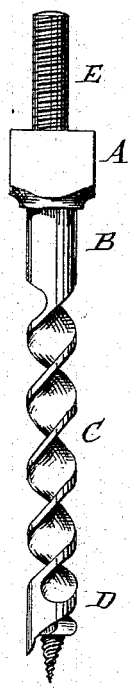
Fig: 2.
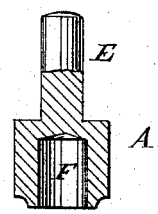
WITNESSES:
INVENTOR:
G. F. Stearns
BY
ATTORNEYS.

UNITED STATES PATENT OFFICE.

GEORGE F. STEARNS, OF CHESTER, CONNECTICUT.

MANUFACTURE OF AUGER-BITS AND OTHER BORING-TOOLS.

SPECIFICATION forming part of Letters Patent No. 288,676, dated November 20, 1883.

Application filed February 10, 1883. (No model.)

*To all whom it may concern:*

Be it known that I, GEORGE F. STEARNS, of Chester, in the county of Middlesex and State of Connecticut, have invented a new and useful Improvement in the Manufacture of Auger-Bits and other Boring-Tools, of which the following is a full, clear, and exact specification.

Reference is to be had to the accompanying drawings, forming a part of this specification, in which similar letters of reference indicate corresponding parts in both the figures.

Figure 1 is a side elevation of a completed bit. Fig. 2 is a side elevation, partly in section, of the blanks from which the bit is made.

The object of this invention is to facilitate and cheapen the manufacture of auger-bits and other boring-tools.

The invention relates to forming the stock of a steel rod of the proper size and length and welding a malleable-iron shank upon it. The malleable-iron shank is made with a tang and a recess to receive the end of the stock, as will be hereinafter fully described.

As heretofore made, auger-bits and boring-tools for boring and mortising machines have been made by turning a square bar of the proper size to form the square shank A to the size of the round shank B. The round shank B was then flattened, and the pod or twist C and head D were formed. The tang E was then formed, the screw-thread was cut upon it, and the shoulders of the square shank A were turned up or finished.

By my improvement the stock B C D is formed of a round steel rod of the proper size for the round shank B, and cut into proper length, so that no turning down is required. The square shank A and tang E are then struck up or cast of malleable iron, and with a recess, F, to receive the end of the round shank B, as indicated in Fig. 2. The square shank A is then placed upon and welded to the round shank B by a hammer, a press, or other suitable means. The stock B C D is then completed, and the thread is cut upon the tang E in the ordinary manner.

By this improvement the operation of manufacturing the bits is facilitated and the cost of manufacture is greatly reduced.

Having thus described my invention, I claim as new and desire to secure by Letters Patent—

1. A method of making auger-bits and boring-tools, which consists in first forming of malleable metal a square shank and tang in one piece and with a recess to receive the round shank; secondly, welding the said square shank to a round steel shank; and, thirdly, cutting the thread on the tang, as described.

2. For the manufacture of auger-bits and other boring-tools, the square shank A, made, substantially as herein shown and described, with a tang, and a recess to receive the stock, as set forth.

GEORGE F. STEARNS.

Witnesses:
FRED B. CHAFFEE,
W. J. BRECKENRIDGE.